United States Patent [19]

Rock et al.

[11] 4,268,580

[45] May 19, 1981

[54] RADIATION CURED COATING FOR LEATHER

[75] Inventors: John D. Rock, Hunters Hill; John L. Garnett, Longueville, both of Australia

[73] Assignee: Unisearch Limited, Kensington, Australia

[21] Appl. No.: 75,058

[22] Filed: Sep. 12, 1979

[30] Foreign Application Priority Data

Sep. 13, 1978 [AU] Australia .............................. PD5918

[51] Int. Cl.³ .............................................. B05D 3/06
[52] U.S. Cl. ................................. 428/423.4; 427/44; 427/54.1; 427/370; 427/389; 526/286
[58] Field of Search ................ 427/44, 54.1, 370, 389; 526/286; 260/27; 428/423.4

[56] References Cited

U.S. PATENT DOCUMENTS

| | | | |
|---|---|---|---|
| 3,979,426 | 9/1976 | Demajistre | 427/54.1 |
| 4,013,806 | 3/1977 | Volkert et al. | 427/54.1 |
| 4,016,127 | 4/1977 | Larsson et al. | 427/389 |
| 4,057,657 | 11/1977 | Garnett et al. | 427/54.1 |

*Primary Examiner*—John H. Newsome
*Attorney, Agent, or Firm*—Beveridge, DeGrandi, Kline & Lunsford

[57] ABSTRACT

The invention relates to a radiation curable composition for coating onto leather. The composition comprises from 40 to 90% by weight of a first compound which is a prepolymer or co-prepolymers and from 60 to 10% by weight of a second compound which is mutually soluble with the first. The prepolymer or co-prepolymer is derived from monomer units of which at least 80% are an acrylate or methacrylate monomer and of which the balance, if any, may be styrene or its derivatives or isoprene. Preferably, at least 50% by weight of the prepolymer is butyl acrylate and up to 20% by weight is styrene. The second compound is one or more of urethane acrylate, epoxy acrylate; a rosin derivative; a monomer of vinyl chloride, vinyl acetate, vinylidene chloride or methyl methacrylate or copolymers of such monomers. The composition may be cured after coating onto leather by U.V. or electron beam radiation.

19 Claims, No Drawings

RADIATION CURED COATING FOR LEATHER

BACKGROUND OF THE INVENTION

The present invention relates to a composition for coating on leather substrates, which may be cured in situ by means of radiation and to a method for applying the composition to leather.

Leathers, and particularly leathers for use in shoe uppers, are frequently coated with polymers to enhance properties, such as wet and dry scuff and abrasion resistance, water resistance, gloss, and the like.

The range of polymer compositions suitable for use in such applications has hitherto been severely limited. On the one hand it is difficult to formulate compositions, which will confer these properties on leather while retaining desirable "feel", appearance, air permeability, flexibility and other desirable characteristics of leather. On the other hand, the methods of obtaining tough polymer coatings usually used in other industries generally involve cross-linking by heat and are inapplicable to leather by virtue of leather's inability to withstand heat without detrimental effects.

In fact, in the past, only nitrocellulose and P.V.C. coatings have met with any commercial success for imparting toughness and other of the desirable properties to which reference has been made above. Neither nitrocellulose nor P.V.C. coatings impart all of the desirable characteristics in the desired degree, but to date have been the most satisfactory.

Moreover application of polymer coatings such as previously used is time consuming, labour intensive and costly. For example nitrocellulose is sprayed from solvents solution onto individual hides. Four separate coatings are usually necessary to build up the thickness required to confer desirable properties, and drying is required between each spraying operation.

It is well known that polymers may be cross-linked by radiation. However early attempts to apply gamma radiation for this purpose to polymer coatings on leather substrates were unsatisfactory because of the detrimental effect of gamma radiation on the leather at the dose rates required to achieve sufficient cross-linking.

Moreover, as a general rule polymers, which tend to cure rapidly under the influence of radiation, tend not to have a commercially practicable shelf life.

To be commercially useful as a coating for leather, a radiation curable composition should have a stable shelf life, a viscosity enabling convenient application to the substrate or be capable of adjustment to a convenient viscosity, be capable of rapid cure by radiation under conditions not detrimental to leather, in addition to forming films having at least the attributes of previously available nitrocellulose compositions.

Thus, to date it has not proved possible to produce a radiation curable surface coating for leather, which would perform satisfactorily in comparison with traditional nitrocellulose coatings, and which also could be applied so that, in the finished product, it would be economically competitive with nitrocellulose coatings.

BRIEF SUMMARY OF THE INVENTION

According to the first aspect, the invention consists in a radiation curable composition for coating onto a leather substrate comprising:

from 40 to 90% by weight thereof of at least one first compound selected from the group consisting of prepolymers and co-prepolymers, said first compound being derived from copolymerizable monomers selected from the groups consisting of acrylatees, methacrylates, styrene, styrene derivatives and isoprene, at least 80% by weight of said monomers being selected from the group consisting of acrylates and methacrylates;

from 60 to 10% by weight of said composition consisting of a second compound selected from the group consisting of urethane acrylate; epoxy acrylate; rosin derivatives; monomers of vinyl chloride, vinyl acetate, vinylidene chloride and methyl methacrylate; polymers derived from monomers included in this group and copolymers derived from monomers included in this group;

said at least one first compound and said at least one second compound forming a mutually soluble solution.

According to a second aspect, the invention consists in a method for coating a leather substrate comprising the steps of:

applying to a surface of said leather a layer of a coating of a composition according to the first aspect, and irradiating said composition with U.V. radiation or an electron beam whereby to cure said composition.

In preferred embodiments the first compound selected is a prepolymer of butyl acrylate or, more preferable, a co-prepolymer of butyl acrylate with styrene, and the second compound is urethane acrylate.

DETAILED DESCRIPTION

Coating compositions according to the invention comprise a mixture of two portions.

One portion consists of a compound, which is a prepolymer or co-prepolymer, comprising at least 80% by weight of acrylate or methacrylate species and the balance, if any, comprising styrene, styrene derivative, or isoprene species.

Prepolymers are polymers of low molecular weight capable of undergoing further polymerisation. Co-prepolymers are prepolymers derived from prepolymerisation of co-monomers. As herein used the term "prepolymer" includes the term "co-prepolymer" where the context so admits. It has been found that by use of prepolymers derived from acrylate or methacrylate monomers or mixtures of them, then a much faster rate of cure can be obtained by electron beam or ultraviolet irradiation than if corresponding monomers are used. For preference the prepolymers are prepared by irradiation of the acrylate or methcrylate monomers or co-monomers. Typically, prepolymers for use in the invention have a viscosity above 50 centipoise and below 100 poise.

Although giving coatings having satisfactory properties, acrylate and methacrylate prepolymers do not have a long shelf life and have a tendency to gel. It has been further found that by incorporating up to 20% of styrene in the prepolymer of the first compound, preferably by co-prepolymerising the acrylate or methacrylate monomers with styrene monomers, compositions according to the invention have a stable shelf life and can be used several months after preparation. Preferably the co-prepolymerisation with styrene is also accomplished by irradiation techniques.

Increasing the styrene content of the co-prepolymer above 20% produces a composition resulting in coatings of insufficient flexibility. The quantity of styrene incorporated in the co-prepolymer is preferably in the range of from 1 to 20% and more preferably is in the range of from 5 to 15%. Although styrene is preferred, other styrene derivatives, for example halo or methyl styrenes, can be used. Isoprene can also be used. For adequate flexibility at least 80% of the monomer units of the co-prepolymer should be acrylic or methacrylic species.

The preferred acrylate for use in the first portion is butyl acrylate although other acrylic ester prepolymers and methacrylic ester prepolymers have been successfully employed. To obtain the desirable degree of flexibility, at least 50% by weight of the first compound should be butyl acrylic or butyl methacrylic species, butyl acrylic being preferred. More preferably, at least 80% by weight of the first compound are desirably butyl acrylic species. However, for economic reasons, other acrylic species can be included in the prepolymer or co-prepolymer without significantly reducing performance. It will be understood that a mixture of prepolymers selected in the above matter may be employed in the composition.

The prepolymer or co-prepolymer component of the composition preferably constitutes from 40 to 90% by weight, and more preferably from 75 to 85% by weight, of the coating composition. At less than 40% by weight the composition imparts insufficient toughness to the leather, while at greater than 90% by weight the coating has insufficient flexibility.

The balance of the composition may be one or more selected second compounds the choice being determined primarily by cost considerations but also to a degree by the importance placed on one or other desirable characteristic to be imparted to the leather. The preferred material for use in the balance of the composition is urethane acrylate. Urethane acrylates, such as are commercially available under the trade names THIOKOL CHEMPOL XR19962-37, WITCO, PURELAST, and POLYCROME, have been successfully employed.

When P.V.C. is used, modified P.V.C., such as may be obtained by reclamation, is suitable. In such a case the P.V.C. may advantageously be dissolved in vinyl pyrrolidone or a mixture of vinyl pyrrolidone and methyl methylacrylate. If epoxy acrylate is chosen, this may be either of a fast cure or a slow cure type, the latter being preferable. If rosin is used, then preferably it is dissolved in styrene and, preferably, also the ratio to styrene is approximately 2 to 1 although it may be in the range of from 1 to 1 to 3 to 1 by weight. Copolymers of vinyl chloride and vinyl acetate may also be used and may be dissolved in vinyl pyrrolidone and methyl methylacrylate. Vinylacetate, vinylidene chloride and mixtures of styrene with polystyrene have also been employed.

It is important that the first compound and the second compound are selected, and that the ratio of one to the other is selected, so that they are mutually soluble when mixed together to form the coating composition.

For preference the ratio is selected so that nitrocellulose is also soluble in the coating composition thus permitting traditionally used pigments and dyestuffs to be added using nitrocellulose as a vehicle. Up to 30% by weight of nitrocellulose by weight of the composition of the invention may be added without significantly impairing the cure properties thereof. Preferably not more than 10% of a nitrocellulose vehicle is added.

In application, the composition may be adjusted to a viscosity for spraying by means of any suitable solvent for example acetone, benzene or toluene, and may be sprayed on the hides at a coating rate of from 5 to 60 grams per square meter, but more preferably from 19 to 28 grams per square meter. At less than 5 grams per square meter the coating is unsatisfactory in respect of water resistance and at greater than 60 grams per square meter the coating results in a brittle coating.

Compositions according to the invention may also be applied and cured in the absence of solvents.

After the coating has been sprayed on the leather it is cured by irradiating with electron beam or ultraviolet radiation. It is preferred that the intensity of the radiation be sufficiently high to ensure a rapid cure.

If ultraviolet radiation is to be used to cure the coating, then a U.V. sensitizer is desirably added to the composition of the invention. Preferably from 1 to 10% by weight of the composition of a conventional U.V. sensitiser, and more preferably from 2 to 7% by weight, is added to promote cure. The sensitizer may be added with the solvent if a solvent is used. The preferred sensitisers are acyloins such as benzoin ethyl ether; however, other conventional U.V. sensitisers, for example inorganic compounds such as uranyl nitrates, ketones such as benzophenone or Michler's ketone, azides and mixtures and synergistic mixtures of U.V. sensitisers may be used. If cure by electron beam is to be used, then it is preferable not to include a U.V. sensitiser, since such addition is an unnecessary cost and tends to retard cure rate. If desired, other conventional film modifiers, plasticizers, stabilizers, pigments and dyes may be added to the composition, but the quantity added should not in aggregate exceed 10% by weight of the composition. For example, 1% of maleic anhydride improves toughness or dioctyl pthalate may be incorporated as a plasticizer. Traditionally used pigments and dyes may conveniently be incorporated in the composition by use of nitrocellulose as a vehicle.

It has been found that those of the preferred coating materials according to this invention which incorporate U.V. sensitisers may be cured in a fraction of a second when subject to ultraviolet radiation from a focussed 200 watt per inch U.V. lamp situated at a distance of 7cm from the coated surface of the substrate. Tables 1–8, given by way of example only, show the results of tests conducted on various compositions in comparison with nitrocellulose coatings.

In the following examples coating materials of various compositions were prepared and were coated onto blue full grain side leather.

Unless otherwise indicated the compositions were applied by spraying. In that case the viscosity of the composition was adjusted to a suitable viscosity for spraying using a solvent consisting of benzene, which contained 10% by weight of the composition of benzoin ethyl ether as a U.V. sensitizer (hereinafter referred to as solvent 1). However, some samples were applied without solvent or with other solvents as indicated. Some coatings were also applied by brushing, roller coating and spatula spreading.

Unless otherwise indicated the composition was applied in one coating of from 19 g m$^{-2}$ to 28 g m$^{-2}$ in coating weight.

In all cases, the coating was cured for a fraction of a second under a 200 watt focused U.V. lamp at a distance of 7 cm. After curing, the coatings were sealed using a toggling press with plates heated to approximately 180° F.

Test 1 and test 2 relate to flex text conducted on samples using a SATRA flexometer.

In Test 1 the samples were graded according to appearance when cracking first became evident and the number of flexes to that point is shown in brackets if significantly less than 100,000 flexes.

In Test 1;
- A=No cracking evident
- B=Powdering or very slight cracking
- C=Extensive cracking
- D=Embrittled.

In test 2 the samples were graded according to appearance after flexing. The test, was continued to 100,000 flexes unless otherwise noted in brackets:

In test 2;
- A=No cracking evident
- B=Very slight cracking
- C=Slight cracking
- D=Cracking.

Test 3 was adhesive tape test. In test 3, the samples were graded according to the effect of standard adhesive tape on the surface;
- A=No effect
- B=Very slight spotting
- C=Slight Spotting
- D=Lifts finish.

In test 4 samples were subjected to Dry Rub tests at 500 r.p.m. and in test 5 to Wet Rub tests at 150 r.p.m. using a SATRA Grey Scale Test apparatus in both cases. On the scale used, 5 is the best performance, then 5−, 4+, 4− and so on.

The Wet Rub appearance is shown in Test 6 graded as A (acceptable), S (slight tide mark) or U (Unacceptable).

Rub and stretch tests were conducted on a SATRA lastometer at 6.5 mm extension, 4 being the best value obtainable on this test.

Samples were compared with two controls.

Control A was uncoated leather, control B was leather coated with nitrocellulose (4 coats) in accord with usual industrial practice.

In the following tables the abbreviations used have the meanings given below.
- UAO: Thiokol urethane acrylate obtained from THIOKOL CORP. as ZL788.
- BuAc: Butyl Acrylate prepolymer.
- PP1: A prepolymer of 90% Butyl Acrylate with 10% styrene.
- PP2: A prepolymer of 85% Butyl Acrylate with 15% styrene.
- S.C. Epoxy F: A fast cure epoxy acrylate from Sidney Cook.
- S.C. Epoxy S: A slow cure epoxy acrylate from Sidney Cook.
- Sty: Styrene
- Vinylite: Vinylidene chloride containing 15% by weight vinyl acetate from Union Carbide.
- NVP: Vinyl Pyrrolidone
- MMA: Methyl Methacrylate Monomer
- P.V.C.: Poly Vinyl Chloride
- UAI: Urethane Acrylate from WITCO
- UAII: Urethane Acrylate from Chempol (194827)
- UAIII: Urethane Acrylate from Chempol (19962-37)
- UAIV: Urethane Acrylate from Chempol (194832)
- Polylite: Polyester in Styrene from Union Carbide
- B.E.E.: Benzoin Ethyl Ether As is apparent from the tables many of the samples tested out-perform nitrocellulose in respect of flex tests, having a good appearance after 100,000 flexes against 15-20,000 flexes typically obtainable with nitrocellulose coatings.

However, of these, many fail on wet rub appearance or are marginal in other respects. Samples 3, 4, 12,13, 14, 15, 25, 26, 32, 37 according to the invention gave comparable or superior performance to nitrocellulose coatings previously used.

As will be apparent to those skilled in the art, the coating may be applied to hides on a conveyor belt, and by virtue that only one coating is required and that very rapid cure is obtained, the labour costs of application and handling are very much lower than for traditional methods required to apply nitrocellulose coatings. However, a required thickness of coating may be built up in several successive spray-cure cycles if desired.

TABLE 1

| Sample No. | SAMPLE Coating Composition | Solvent | Test 1 | Test 2 | Test 3 | Test 4 | Test 5 | Test 6 | Test 7 |
|---|---|---|---|---|---|---|---|---|---|
| Control A | Leather | | A | A | D | 4 | 3 | U | 3-2 |
| Control B | Nitrocellulose | | A | D | A-B | 4 | 4 | A | 3-4 |

Test 1 - PREFLEX
Test 2 - POSTFLEX
Test 3 - TAPE
Test 4 - DRY RUB
Test 5 - WET RUB
Test 6 - WET APPEARANCE
Test 7 - STRETCH RUB

TABLE 2

| Sample No. | Coating Composition | Solvent | Test 1 | Test 2 | Test 3 | Test 4 | Test 5 | Test 6 | Test 7 |
|---|---|---|---|---|---|---|---|---|---|
| 1 | 100% UAO | 1 | A | C | C | 5 | 5 | A | 4 |
| 2 | 80% UAO + 20% Bu Ac | 1 | A | C | A | 5- | 5- | A | 4 |
| 3 | 60% UAO + 40% Bu Ac | 1 | A | A | A | 5-4 | 5- | A | 3 |
| 4 | 40% UAO + 60% Bu Ac | 1 | B | B | B | 5- | 5 | A | 4 |
| 5 | 20% UAO + 80% Bu Ac | 1 | A | A | A | 5- | 5- | U | 4 |
| 6 | 15% UAO + 85% Bu Ac | 1 | A | B | A | 5- | 5 | U | 3 |
| 7 | 10% UAO + 90% Bu Ac | 1 | B | B | A | 5- | 5- | U | 4 |
| 8 | 5% UAO + 95% Bu Ac | 1 | A | D | A | 5- | 4 | U | 4 |

TABLE 2-continued

| Sample No. | Coating Composition | Solvent | Test 1 | Test 2 | Test 3 | Test 4 | Test 5 | Test 6 | Test 7 |
|---|---|---|---|---|---|---|---|---|---|
| 9 | 0% UAO + 100% Bu Ac | 1 | A | A | A | 5- | 4 | U | 4 |

Test 1 - PREFLEX
Test 2 - POSTFLEX
Test 3 - TAPE
Test 4 - DRY RUB
Test 5 - WET RUB
Test 6 - WET APPEARANCE
Test 7 - STRETCH RUB

TABLE 3

| Sample No. | Coating Composition | Solvent | Test 1 | Test 2 | Test 3 | Test 4 | Test 5 | Test 6 | Test 7 |
|---|---|---|---|---|---|---|---|---|---|
| 10 | 100% UAO 0% P.P.I. | 1 | A | B | C | 5 | 5 | A | 4 |
| 11 | 80% UAO 20% P.P.I. | 1 | A | C | A | 5- | 5 | A | 3-2 |
| 12 | 60% UAO 40% P.P.I | 1 | A | B | A | 5- | 5 | A | 4 |
| 13 | 40% UAO 60% P.P.I. | 1 | A | D | A | 5- | 5 | A | 4 |
| 14 | 20% UAO 80% P.P.I. | 1 | A | B | A | 5- | 5 | A | 4 |
| 15 | 15% UAO 85% P.P.I. | 1 | A | A | B | 5- | 5 | A | 3 |
| 16 | 10% UAO 90% P.P.I. | 1 | A | D | A | 5 | 5 | A | 4 |
| 17 | 5% UAO 95% P.P.I. | 1 | A | A | A | 5- | 5- | U | 4 |
| 18 | 0% UAO 100% P.P.I. | 1 | A | B | A | 5- | 5- | A | 4 |

Test 1 - PREFLEX
Test 2 - POSTFLEX
TEST 3 - TAPE
TEST 4 - DRY RUB
TEST 5 - WET RUB
TEST 6 - WET APPEARANCE
TEST 7 - STRETCH RUB

TABLE 4

| Sample No. | Coating Composition | Solvent | Test 1 | Test 2 | Test 3 | Test 4 | Test 5 | Test 6 | Test 7 |
|---|---|---|---|---|---|---|---|---|---|
| 19 | 20% UAO + 80% BuAc 0.6g/m$^{-2}$ | 1 | A | C | B | 5- | 5-4 | U |  |
| 20 | 20% UAO + 80% BuAc 4.6g/m$^{-2}$ | 1 | A | C | B | 5- | 5-4 | U | 4 |
| 21 | 20% UAO + 80% BuAc 5.6g/m$^{-2}$ | 1 | A | C | A | 5- | 5- | U | 4 |
| 22 | 20% UAO + 80% BuAc 8.2g/m$^{-2}$ | 1 | A | C | B | 5- | 4 | U | 4 |
| 23 | 20% UAO + 80% BuAc 13.0g/m$^{-2}$ | 1 | A | B | B | 5- | 5-4 | U | 4 |
| 24 | 20% UAO + 80% BuAc 19.2g/m$^{-2}$ | 1 | A | A | A | 5 | 5-4 | A | 4 |
| 25 | 20% UAO + 80% BuAc 28.0g/m$^{-2}$ | 1 | A | A | A | 5 | 5 | A | 4 |
| 26 | 20% UAO + 80% BuAc 60.4g/m$^{-2}$ | 1 | A | B | A | 5 | 5 | A | 4 |

TEST 1 - PREFLEX
TEST 2 - POSTFLEX
TEST 3 - TAPE
TEST 4 - DRY RUB
TEST 5 - WET RUB
TEST 6 - WET APPEARANCE
TEST 7 - STRETCH RUB

TABLE 5

| Sample No. | Coating Composition | Solvent | Test 1 | Test 2 | Test 3 | Test 4 | Test 5 | Test 6 | Test 7 |
|---|---|---|---|---|---|---|---|---|---|
| 27 | 100% Epoxy F | 1 | C(o) | — | A | 5 | 5 | A |  |
| 28 | 20% Epoxy F + 80% P.P.I. | — | A | D | A | 5 | 5 | A | 2 |
| 29 | 100% Epoxy S | 1 | A | A | C | 5 | 5 | U | 4 |
| 30 | 20% Epoxy S + 80% P.P.I. | — | A | A | D | 5- | 5-4 | A | 4 |
| 31 | 100% (Rosin:Sty 2:1 w/w) | 10% BEE (Brushed) on | B (6000) | D | B | 3-2 | 5 | A | 4 |
| 32 | 20% (Rosin:Styrene 2:1 w/w) 80% P.P.I. | (Brushed) on | A | A | A | 3 | 5 | A | 2 |
| 33 | Styrene/Polystyrene | (Brushed) on | B (4300) | B | A | 5- | 5 | A | 4 |
| 34 | 100% (Vinylite/NVP/MMA) | spread on | C(o) | — | D | 5 | 5 | U | 4 |
| 35 | 20% (Vinylite/NVP/MMA) 80% P.P.I. | spread on | B(o) | — | A | 5- | 5- | A | 2 |
| 36 | 100% (PVC/NVP/MMA) | spread on | C(o) | — | D | 5 | 5 | A | 3 |
| 37 | 20% (PVC/NVP/MMA) + 80% | spread | A | B | A | 5- | 5-4 | A | 2 |

TABLE 5-continued

| Sample No. | Coating Composition | Solvent | Test 1 | Test 2 | Test 3 | Test 4 | Test 5 | Test 6 | Test 7 |
|---|---|---|---|---|---|---|---|---|---|
| | P.P.I. | on | | | | | | | |

TEST 1 - PREFLEX
TEST 2 - POSTFLEX
TEST 3 - TAPE
TEST 4 - DRY RUB
TEST 5 - WET RUB
TEST 6 - WET APPEARANCE
TEST 7 - STRETCH RUB

TABLE 6

| Sample No. | Coating Composition | Solvent | Test 1 | Test 2 | Test 3 | Test 4 | Test 5 | Test 6 | Test 7 |
|---|---|---|---|---|---|---|---|---|---|
| 38 | 100% U.AI | I | D(o) | A | A | 5- | 5- | U | 2 |
| 39 | 20% U.AI + 80% PPI | — | A | D | B | 5- | 5:- | U | 4 |
| 40 | 100% U.AII | I | A | B | B | 5- | 5- | U | 4 |
| 41 | 20% U.AII + 80% PPI | — | A | A | D | 5- | 5-4 | U | 4 |
| 42 | 100% U.AIII | I | A | A | A | 5 | 5 | U | 3 |
| 43 | 20% U.AIII + 80% PPI | — | B(2800) | B | A | 5- | 4 | U | 3 |
| 44 | 100% U.AIV | I | B(2800) | B | A | 5- | 5- | U | 2 |
| 45 | 20% U.AIV + 80% PPI | I | A | B | A | 5- | 5-4 | U | 4 |
| 46 | 95% Sty/Polystyrene + 5% Vinylacetate | spread | C(o) | A | A | 4 | 5 | A | 2 |
| 47 | 100% Polylite | I | B(4400) | B | A | 5 | 5 | U | 2 |
| 48 | 20% Polylite + 80% PPI | Benzene | B(o) | B | C | 5- | 5- | U | 3 |

TEST 1 - PREFLEX
TEST 2 - POSTFLEX
TEST 3 - TAPE
TEST 4 - DRY RUB
TEST 5 - WET RUB
TEST 6 - WET APPEARANCE
TEST 7 - STRETCH RUB

TABLE 7

| Sample No. | Coating Composition | Solvent | Test 1 | Test 2 | Test 3 | Test 4 | Test 5 | Test 6 | Test 7 |
|---|---|---|---|---|---|---|---|---|---|
| | Very dilute solution | | | | | | | | |
| 50 | PPII - 2.4 g/m$^{-2}$ | I | A | A | D | 4 | 3 | S | 3-2 |
| 51 | PPII - 6.8 g/m$^{-2}$ | I | A | A | D | 4 | 3 | S | 3-2 |
| 52 | PPII - 12.2 g/m$^{-2}$ | I | A | A | D | 4 | 3 | S | 3 |
| 53 | PPII - 36.2 g/m$^{-2}$ | I | B(o) | D | D | 4 | 4 | A | 3-2 |
| 54 | PPII - 46.6 g/m$^{-2}$ | I | B(o) | B | A | 4 | 4 | A | 3 |
| 55 | PPII - 55.0 g/m$^{-2}$ | I | B(o) | B | B | 4 | 4-3 | A | 3- |
| 56 | PPII - 74.0 g/m$^{-2}$ | I | B(o) | B | A | 4 | 4 | A | 3- |
| 57 | PPII - 89.6 g/m$^{-2}$ | I | B(o) | C | A | 4 | 4 | A | 3 |

TEST 1 - PREFLEX
TEST 2 - POSTFLEX
TEST 3 - TAPE
TEST 4 - DRY RUB
TEST 5 - WET RUB
TEST 6 - WET APPEARANCE
TEST 7 - STRETCH RUB

TABLE 8

| Sample No. | Coating Composition | Solvent | Test 1 | Test 2 | Test 3 | Test 4 | Test 5 | Test 6 | Test 7 |
|---|---|---|---|---|---|---|---|---|---|
| | Dilute Solution | | | | | | | | |
| 58 | PPII - 18.2 g/m$^{-2}$ | I | A | A | D | 4 | 3 | S | 3-2 |
| 59 | PPII - 22.0 g/m$^{-2}$ | I | A | A | D | 4 | 3- | A | 3-2 |
| 60 | PPII - 38.4 g/m$^{-2}$ | I | B(o) | B | A | 4 | 4-3 | A | 3- |
| 61 | PPII - 47.8 g/m$^{-2}$ | I | A | A | A | 4 | 4-3 | A | 3- |
| 62 | PPII - 88.0 g/m$^{-2}$ | I | B(o) | B | A | 4 | 4 | A | 4 |
| 63 | PPII - 113.2 g/m$^{-2}$ | I | C(o) | C | A | 4 | 4 | A | 3-2 |
| 64 | PPII - 93.2 g/m$^{-2}$ | I | D(o) | C | A | 4 | 4 | A | 3 |
| 65 | PPII - 119.0 g/m$^{-2}$ | I | D(o) | C | A | 4 | 4 | A | 4 |

TEST 1 - PREFLEX
TEST 2 - POSTFLEX
TEST 3 - TAPE
TEST 4 - DRY RUB
TEST 5 - WET RUB
TEST 6 - WET APPEARANCE
TEST 7 - STRETCH RUB

We claim:

1. A radiation curable leather substrate coating composition comprising:

(A) from 40 to 90% by weight thereof of at least one first compound selected from the group consisting of prepolymers and co-prepolymers, said first compound being derived from polymerizable monomers selected from the group conisisting of alkyl acrylates, alkyl methacrylates, styrene, styrene derivatives and isoprene, wherein at least 80% by weight of said monomers are selected from the group consisting of alkyl acrylates and alkyl methacrylates; and (B) from 60 to 10% by weight of said composition consisting of a second compound, which is polymerizable with said first compound, selected from the group consisting of urethane acrylate; epoxy acrylate; rosin derivatives;

monomers of vinyl chloride, vinyl acetate, vinylidene chloride and methyl methacrylate; polymers derived from monomers included in this group; and wherein said at least one first compound and said at least one second compound form a mutually soluble solution.

2. A composition according to claim 1 wherein said at least one first compound comprises from 75% to 85% by weight thereof.

3. A composition according to claim 1 wherein said first compound selected is derived from monomers of which at least 50% by weight are butyl acrylate.

4. A composition according to claim 1 wherein said first compound selected is derived from monomers of which at least 50% by weight are butyl methacrylate.

5. A composition according to claim 1 wherein said first compound selected is a co-prepolymer derived from monomers of which up to 20% by weight are styrene.

6. A composition according to claim 5 wherein said co-prepolymer is derived from monomers of which from 5 to 15% by weight are styrene.

7. A composition according to claim 1 wherein said first compound selected is a co-prepolymer derived from monomers of which at least 50% by weight are selected from the group consisting of butyl acrylate and butyl methacrylate and up to 20% by weight are styrene.

8. A composition according to claim 7 wherein said first compound selected is a co-prepolymer derived from monomers of which at least 50% by weight are butyl acrylate and from 5–15% by weight are styrene.

9. A composition according to claim 1 wherein said second compound selected is urethane acrylate.

10. A composition according to any one of claims 2 to 8 wherein said second compound selected is urethane acrylate.

11. A composition according to claim 10 comprising in addition in aggregate up to 10% by weight of said composition of at least one compound selected from the group consisting of U.V. sensitizers, plasticizers, stabilizers and film modifiers.

12. A method for coating a leather substrate comprising the steps of:

applying to a surface of said leather a layer of a coating of a composition according to any one of claims 1 to 9, and irradiating said composition with U.V. radiation whereby to cure said composition.

13. A method for coating a leather substrate comprising the steps of:

applying to a surface of said leather a coating of a composition according to any one of claims 1 to 9 and irradiating said composition with an electron beam whereby to cure said composition.

14. A method according to claim 12 further comprising the step subsequent to said irradiating, of pressing said leather with said coating in contact with a heated plate.

15. A method according to claim 13 further comprising the step subsequent to said irradiating of pressing said leather with said coating in contact with a heated plate.

16. A method for coating a leather substrate comprising the steps of:

applying to a surface of said leather a layer of a coating composition according to claim 11, said composition including a U.V. sensitizer; and irradiating said composition with U.V. irradiation whereby to cure said composition.

17. A method according to claim 16 further comprising the step, subsequent to said irradiating, of pressing said leather with said coating in contact with a heated plate.

18. Leather when coated with a composition according to any one of claims 1 to 9 which has been cured.

19. Leather when coated with a composition according to claim 10 which has been cured.

* * * * *